US009480180B1

(12) United States Patent
Thompson

(10) Patent No.: US 9,480,180 B1
(45) Date of Patent: Oct. 25, 2016

(54) SOLAR POWERED STORAGE AND DISTRIBUTION APPARATUS

(71) Applicant: Jonathan T. Thompson, Norwood, CO (US)

(72) Inventor: Jonathan T. Thompson, Norwood, CO (US)

( * ) Notice: Subject to any disclaimer, the term of this patent is extended or adjusted under 35 U.S.C. 154(b) by 221 days.

(21) Appl. No.: 14/030,282

(22) Filed: Sep. 18, 2013

Related U.S. Application Data

(60) Provisional application No. 61/702,402, filed on Sep. 18, 2012.

(51) Int. Cl.
H02B 1/52 (2006.01)
H02B 1/48 (2006.01)
H05K 7/14 (2006.01)

(52) U.S. Cl.
CPC ........... H05K 7/14 (2013.01); H02B 1/48 (2013.01); H02B 1/52 (2013.01)

(58) Field of Classification Search
CPC .................................. H02B 1/48; H02B 1/52
See application file for complete search history.

(56) References Cited

U.S. PATENT DOCUMENTS

| 6,134,105 | A  | * | 10/2000 | Lueker ............... 361/679.41 |
| 7,817,405 | B2 | * | 10/2010 | Neumann et al. ......... 361/625 |
| 7,916,458 | B2 | * | 3/2011 | Nelson et al. ............. 361/623 |
| 8,809,698 | B2 | * | 8/2014 | Clark et al. ................ 174/535 |
| 2012/0141851 | A1 | * | 6/2012 | Hou et al. ..................... 429/96 |
| 2013/0146118 | A1 | * | 6/2013 | Kelley et al. ............... 136/244 |
| 2014/0041891 | A1 | * | 2/2014 | Kim ........................... 174/50.5 |

FOREIGN PATENT DOCUMENTS

DE 9415823 U * 12/1994 ............ H05K 7/14

* cited by examiner

Primary Examiner — Robert J Hoffberg
(74) Attorney, Agent, or Firm — Williams Intellectual Property; Benjamin F. Williams

(57) ABSTRACT

A solar powered storage and distribution apparatus that includes a plurality of slide boards compressively positional within a water and shock resistant housing, each of said plurality of slide boards in detached and separable relation therein, said plurality of slide boards disposed to compressively immobilize and secure an extant battery, fuse box, and charge controller in a stacked and layered arrangement in circuit with each of an at least one power outlet, an at least one interior power outlet, a pair of binding posts, and a power port, when the housing is moved to a closed position.

19 Claims, 5 Drawing Sheets

SOLAR POWERED STORAGE AND DISTRIBUTION APPARATUS

CROSS-REFERENCE TO RELATED APPLICATIONS

Provisional Application No. 61/702,402 filed Sep. 18, 2012

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of portable power storage and distribution apparatuses are known in the prior art. However, what is needed is a solar powered storage and distribution apparatus that includes a plurality of slide boards compressively positional within a water and shock resistant housing, each of said plurality of slide boards in detached and separable relation therein, said plurality of slide boards disposed to compressively immobilize and secure an extant battery, fuse box, and charge controller in a stacked and layered arrangement in circuit with each of an at least one power outlet, an at least one interior power outlet, a pair of binding posts, and a power port, when the housing is moved to a closed position.

FIELD OF THE INVENTION

The present invention relates to a solar powered storage and distribution apparatus, and more particularly, to a solar powered storage and distribution apparatus that includes a plurality of slide boards compressively positional within a water and shock resistant housing, each of said plurality of slide boards in detached and separable relation therein, said plurality of slide boards disposed to compressively immobilize and secure an extant battery, fuse box, and charge controller in a stacked and layered arrangement in circuit with each of an at least one power outlet, an at least one interior power outlet, a pair of binding posts, and a power port, when the housing is moved to a closed position.

SUMMARY OF THE INVENTION

The general purpose of the solar powered storage and distribution apparatus, described subsequently in greater detail, is to provide a solar powered storage and distribution apparatus which has many novel features that result in a solar powered storage and distribution apparatus which is not anticipated, rendered obvious, suggested, or even implied by prior art, either alone or in combination thereof.

The present invention has been devised to enable a portable power supply, housed in a water and shock resistant housing, whereby a user may access power for peripheral electronic devices when removed from other available power sources. The present device hosts a rechargeable battery within a water and shock resistant housing, readily portable for interconnection with extant peripheral electronics, wherein a plurality of slide boards compressively maintain position of the battery, a charge controller, a fuse box, and a topmost face panel without securable attachment between said components.

The present device, therefore, includes a novel means of housing a battery, a charge controller, a fuse box, and a topmost face panel within a durable housing to enable a portable power source well suited for use outdoors during extended periods over remote terrain or locations.

The present solar powered storage and distribution apparatus, therefore, includes a durable, water resistant housing sealable in a closed position. A plurality of slide boards are positional within the housing to compressively engage against each other when positioned therein to releasably secure together within the housing when the housing is moved to the closed position.

The plurality of slide boards includes a plurality of lid braces, a topmost face panel, a charge controller brace member, and a battery brace. Each of the plurality of slide braces is positional detached within the housing in a stacked and layered arrangement whereby each of said plurality of slide boards compressively engages together rendering each immobile within the housing when the housing is moved to the closed position.

Each of the plurality of slide boards is positioned detached in a layered and compressive stack. When the housing is moved to an open position, each of the plurality of slide boards is removable and each layer readily accessible by a user for interchange of components, access to wiring, maintenance, replacement of fuses, cleaning, or other concerns as case may be.

The plurality of lid braces includes a planar piece, disposed to position parallel with the topmost face panel to engage thereagainst, a first elongate obround piece, and a second elongate obround piece. Each of the first and second elongate obround pieces is disposed longitudinally and perpendicularly relative the planar piece, and is disposed proximal parallel edges of the planar piece.

The topmost face panel is disposed enclosing a bottom portion of the housing. The topmost face panel is sealably positional upon the bottom portion of the housing by means of a seal member disposed perimetrically around said topmost face panel. The topmost face panel includes a control section and a window. The control section hosts at least one interior power outlet, a battery monitor, and a plurality of switches, as will be subsequently described, and the window enables viewing of the underlying plurality of slide boards.

A plurality of rubberlike projections is disposed upon the planar piece of the plurality of lid braces, each of said plurality of rubberlike projections disposed cornerwise upon the planar piece for tractive engagement against the topmost face panel. Thus, when a lid of the housing is moved to the closed position, each of the rubberlike projections is compressively engaged against the topmost face panel, and the topmost face panel is thereby forcibly compressed against the bottom portion of the housing whereby the seal member sealably engages therewith.

The charge controller brace member is disposed to underlie the topmost face panel. The charge controller brace member is configured to host and support around an extant charge controller and a fuse box. The charge controller brace member includes a pair of connecting struts disposed underlying each of the charge controller and fuse box, each of the pair of connecting struts disposed transversely thereunder proximal the ends of said charge controller and fuse box.

The pair of connecting struts includes an extended portion disposed to protrude out from under each of the charge controller and fuse box for compressive engagement with each of a pair of compression struts, disposed perpendicularly relative thereto, disposed between the charge controller brace member and the overlying topmost face panel.

The charge controller and the fuse box are securable to the pair of connecting struts. Each of the pair of compression struts are thence positional to compressively engage against each extended portion of each of the pair of connecting struts to compressively position the charge controller brace member underlying the topmost face panel.

The battery brace is disposed underlying the charge controller brace member. The battery brace includes a planar top piece disposed to overlie an extant battery positioned within the housing. The planar top piece includes a pair of forks and a plurality of rubberlike projections disposed atop the planar top piece. The plurality of rubberlike projections are disposed for tractable engagement against the overlying charge controller brace member when the plurality of slide boards is compressively secured within the housing.

A shunt member is disposed transversely underlying each of the pair of forks and disposed along one side of the battery. The shunt member includes a copper shunt and an ohmmeter disposed thereatop. The shunt member is releasably securable to the pair of forks of the planar top piece by at least one L-shaped bracket. The copper shunt is wired to the negative terminal of the battery, and current applied through the copper shunt is measurable by the ohmmeter disposed thereatop. The ohmmeter is disposed to connect directly with the battery monitor whereby a battery charge is readable.

Underlying the battery brace is a tractable pad disposed to compressively secure the battery brace in position inside the housing. Thus each of the plurality of slide boards is positional within the housing, stacked and arranged for specific compressive engagement together whereby closure of the housing lid tightly compresses each of the plurality of slide boards into an immobile stack. Shocks to the housing are compressively absorbed by means of the plurality of rubberlike projections and the tractable pad.

The housing is securable in the closed position by at least one latch member disposed upon the lid for securable engagement with the housing bottom portion. The at least one latch member securely closes the housing, and maintains compression of the plurality of slide boards therein disposed.

At least one power outlet is disposed on the housing exterior for interconnection of a primary circuit connecting the battery, the charge controller, and the fuse box to an extant peripheral electronic device. In the preferred embodiment herein disclosed, the at least one power outlet comprises a 12 volt cigarette lighter power socket and, alternately, a dual USB power outlet.

A power port is also disposed exteriorly upon the housing for connection of the primary circuit to an extant solar panel, or other available external power source, whereby the battery is rechargeable.

A pair of binding posts is disposed exteriorly upon the housing, each of the pair of binding posts connectable to extant peripheral electronic devices whereby power is directable to said devices through alternate connector types, such as banana plugs, pin connectors, bare wire, or a lug terminal, for example.

At least one interior power outlet is disposed in the control section of the topmost face panel for interconnection of the primary circuit with additional peripheral electronic devices. In the preferred embodiment herein disclosed, the at least one interior power outlet includes a first interior power outlet and a second interior power outlet, each of said first and second interior power outlets comprising a 12 volt cigarette lighter power socket.

A plurality of switches is likewise disposed upon the control section of the topmost face panel for connection of each of the at least one power outlet and the at least one interior power outlet with the primary circuit.

A plurality of fuses is disposed in the fuse box, at least one of said plurality of fuses disposed in circuit between each of the charge controller, the at least one power outlet, the at least one interior power outlet, the pair of binding posts, and the battery. One of the plurality of fuses is likewise disposed between the battery and the fuse box. Current directed through the primary circuit is thus controllable below amperages maintained by each fuse disposed in each leg of the circuit.

A user, therefore, is enabled to charge the battery by interconnection of the housing with a solar panel, or other external power source. Once charged the present solar powered storage and distribution apparatus is portable, as desired, for use powering peripheral electronic devices removed from other available power sources. Each of the plurality of slide boards is arranged detached in a compressible stack whereby, when the housing is moved to the open position, a user may readily access each of the plurality of slide boards for interchange of components, maintenance, or wiring, or other desired access, as case may be.

It is further contemplated as part of this invention that the battery brace may be expediently interchanged with alternate battery braces whereby rapid change of power sources is effected for powering additional electronic devices, or for use extended use of the device subsequent draining of a first battery therein disposed. Such peripheral electronic devices are taken to include cell phones, handhelds, computers, drones, GPS equipment, tablets, and other such electronic devices requiring extended use in locations removed from other available power sources.

It should be further apparent that each of the at least one power outlet, at least one interior power outlet, and pair of binding posts is readily operable when the housing is interconnected to an external power source whereby the battery is not drained during use, as desired.

Thus has been broadly outlined the more important features of the present solar powered storage and distribution apparatus so that the detailed description thereof that follows may be better understood and in order that the present contribution to the art may be better appreciated.

Objects of the present solar powered storage and distribution apparatus, along with various novel features that characterize the invention are particularly pointed out in the claims forming a part of this disclosure. For better understanding of the solar powered storage and distribution apparatus, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
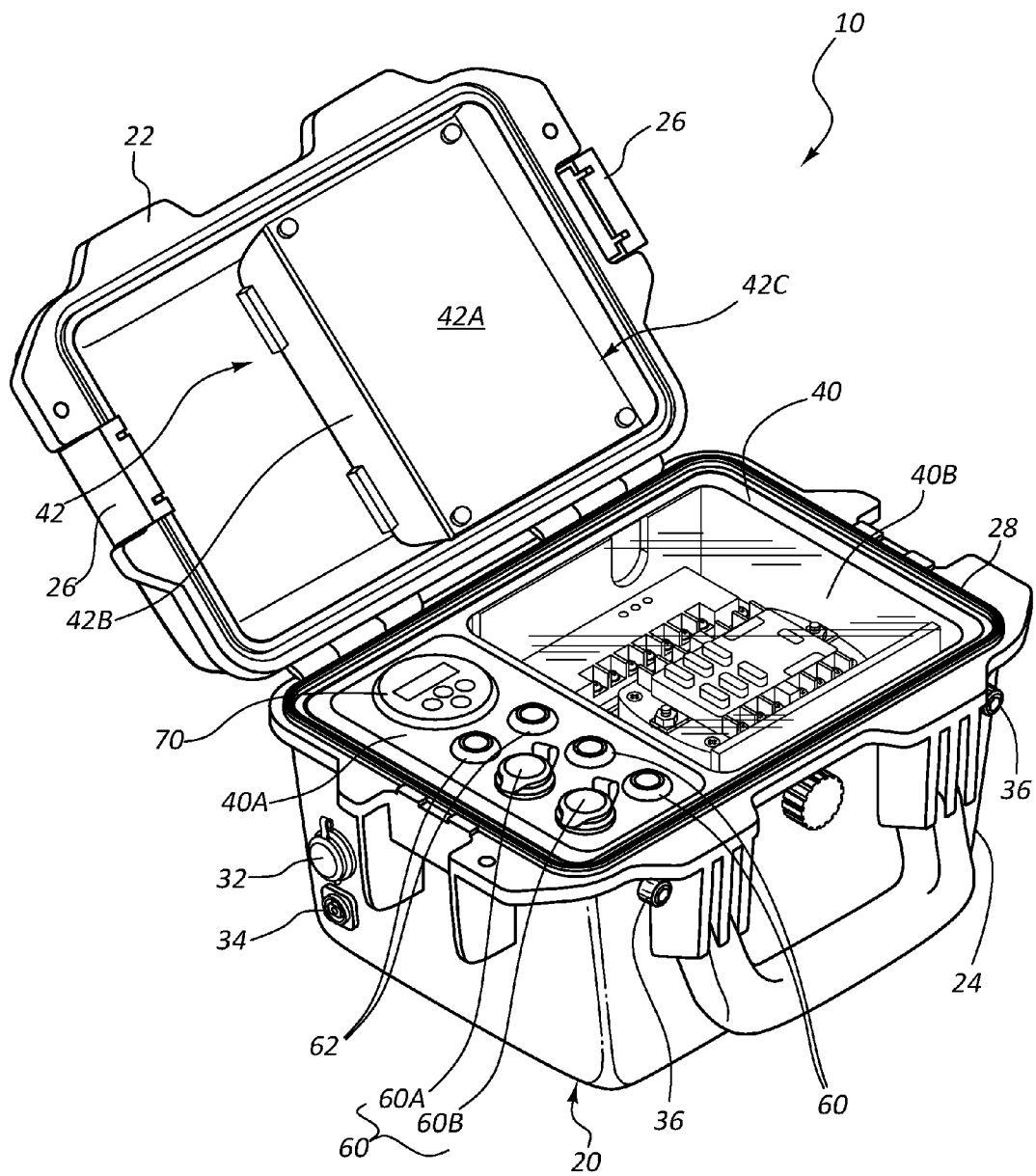
FIG. 1 is an isometric view with a housing disposed in an open position.
Figure 2:
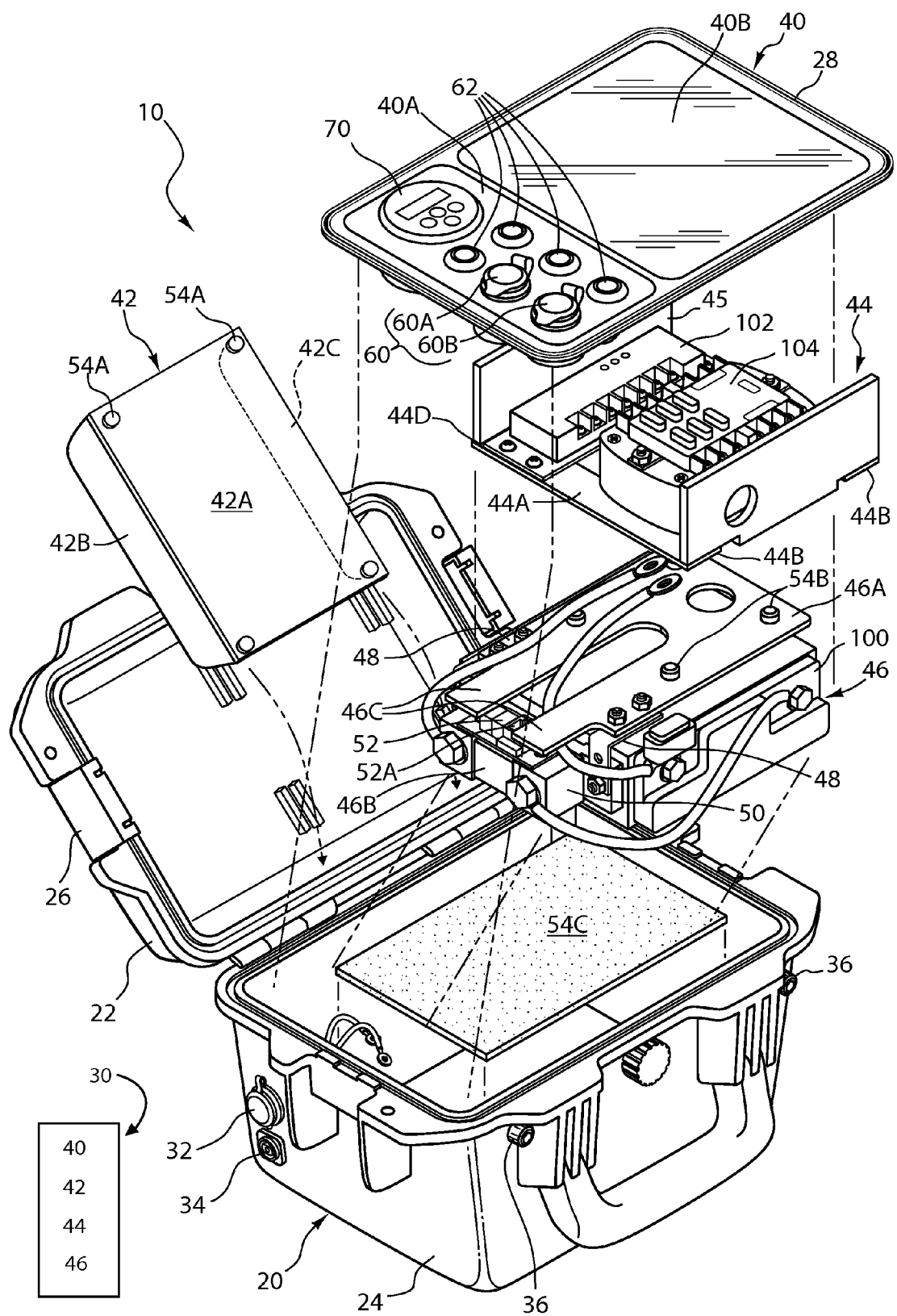
FIG. 2 is an exploded view with each of a plurality of slide boards illustrated in a detached and separable stacked arrangement for compressive securement within the housing.
Figure 3:
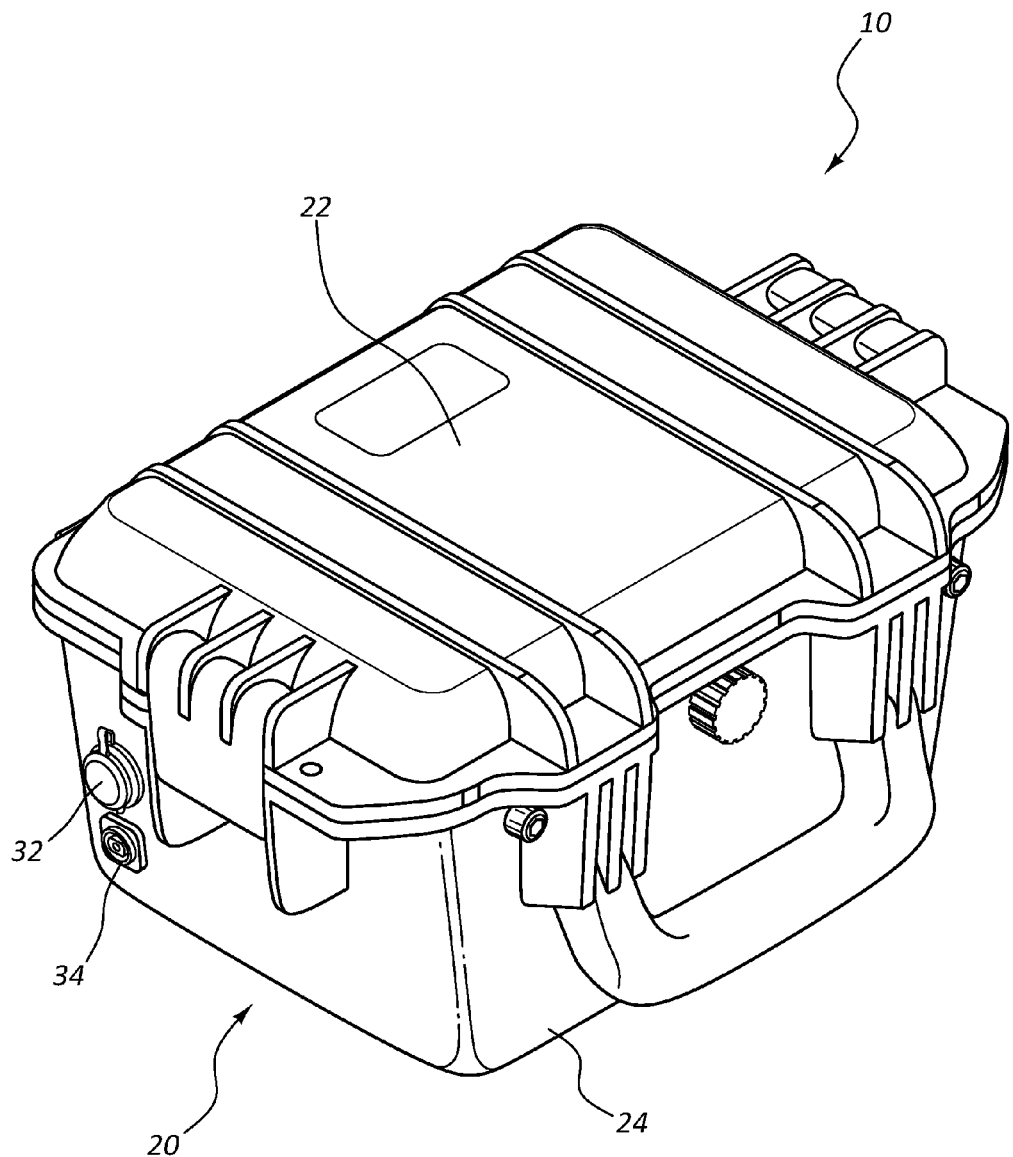
FIG. 3 is an isometric view with a housing disposed in a closed position.
Figure 4:
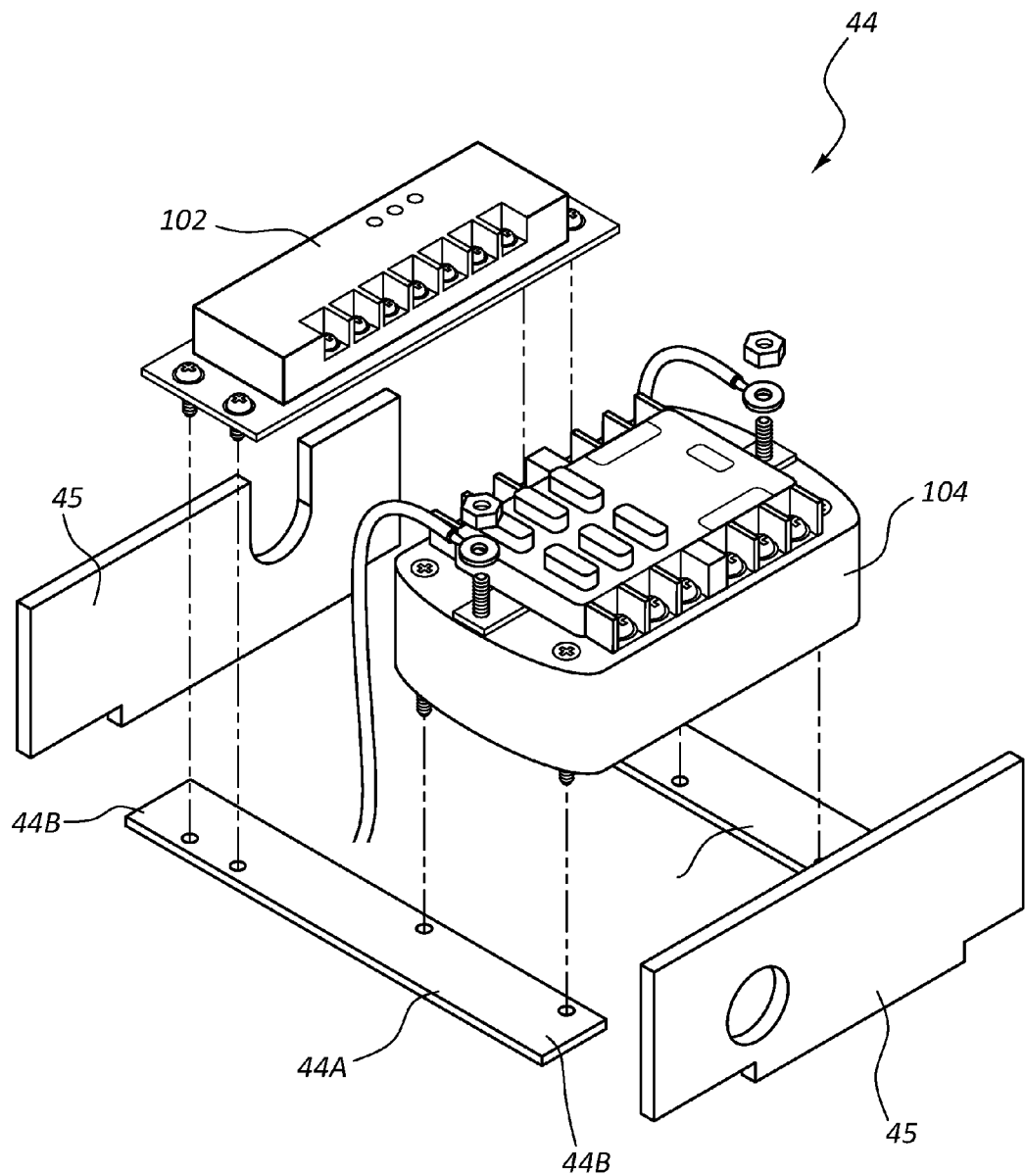
FIG. 4 is an exploded detail view of a battery brace.

With reference now to the drawings, and in particular FIGS. 1 through 5 thereof, example of the instant solar powered storage and distribution apparatus employing the principles and concepts of the present solar powered storage and distribution apparatus and generally designated by the reference number 10 will be described.

Referring to FIGS. 1 through 5 a preferred embodiment of the present solar powered storage and distribution apparatus 10 is illustrated.

The present solar powered storage and distribution apparatus 10 has been devised to enable a convenient and portable means to store and distribute electrical energy to extant peripheral electronic devices when removed from an otherwise available power source. The present solar powered storage and distribution apparatus 10 combines extant components in a novel arrangement to engage a plurality of slide boards 30 under compression in detached and separable relation, whereby each of said components is readily portable, accessible, securable, and resistant to shocks and the elements when ported internal to a housing 20.

The present solar powered storage and distribution apparatus 10, therefore, includes a water resistant, durable housing 20. The housing 20 includes a lid 22 moveable between an open position and a closed position. When moved to the closed position, the lid 22 secures the plurality of slide boards 30 in a stacked, layered arrangement, whereby each component of the device 10 is secured in position within the housing 20 under compression of each of the plurality of slide boards 30, as will be described subsequently.

At least one power outlet 32 is disposed exteriorly upon the housing 20 for interconnection with extant electronic devices and distribution of power thereto, and a power port 34 is disposed exteriorly upon the housing 20 for interconnection with an extant solar panel (not shown), or other extant external power source, whereby a battery 100, disposed interior to the housing 20, is chargeable for repeated use of the apparatus 10 when on the move or otherwise removed from an alternative available power source. A pair of binding posts 36 is disposed exteriorly upon the housing 20, said pair of binding posts 36 connectable to an extant peripheral device to distribute power thereto, as desired.

The plurality of slide boards 30 is disposed in a detached and layered arrangement and thereat compressively securable within the water resistant housing 20 when the lid 22 is moved to the closed position. The plurality of slide boards 30 includes a topmost face panel 40, a plurality of lid braces 42 disposed to compressively engage against the topmost face panel 40, a charge controller brace member 44 configured to secure detached around an extant charge controller 102 and an extant fuse box 104, and a battery brace 46 configured to secure detached around an extant battery 100. Each of the plurality of slide boards 30 is disposed positional to maintain correct alignment of each of the extant charge controller 102, fuse box 104, and battery 100, within a primary circuit 500.

Discussing now the housing 20 and each of the plurality of slide boards 30, the interrelationship and layering of said slide boards 30 will be disclosed.

The housing 20 includes the lid 22 and a bottom portion 24. The lid 22 is hingedly disposed upon the bottom portion 24 and sealably engages thereto when moved to the closed position. At least one latch member 26 is disposed upon the housing 20 to secure the lid 22 in the closed position.

The plurality of lid braces 42 is disposed to compressively secure the topmost face panel 40 in position sealably enclosing the housing 20 bottom portion 24. The plurality of lid braces 42 includes a planar piece 42A, a first elongate obround piece 42B disposed perpendicularly between the housing 20 lid 22 and the planar piece 42A, and a second elongate obround piece 42C disposed perpendicularly between the housing 20 lid 22 and the planar piece 42A in parallel with the first elongate obround piece 42B. Each of the first and second elongate obround pieces 42B, 42C is disposed to compressively engage the planar piece 42A against the topmost face panel 40 when the housing 20 lid 22 is secured in the closed position.

When compressed by the plurality of lid braces 42, the topmost face panel 40 releasably engages a seal member 28, disposed perimetrically around the topmost face panel 40, with the bottom portion 24 of the housing 20. The topmost face panel 40 is thus securably positional upon the bottom portion 24 of the housing 20.

The charge controller brace member 44 includes a pair of connecting struts 44A disposed endwise transversely underlying the charge controller 102 and the fuse box 104 at either end. Each of the pair of connecting struts 44A protrudes an extended portion 44B beneath each of the charge controller 102 and fuse box 104.

To secure the charge controller brace member 44, and therefore the charge controller 102 and fuse box 104, interior to the housing 20, a pair of compression struts 45 is disposed underlying the topmost face panel 40 in compressible engagement with the charge controller brace member 44. Each of said pair of compression struts 45 is disposed to perpendicularly engage against each extended portion 44B of each of the pair of connecting struts 44A whereby securement of the topmost face panel 40 in position within the housing 20 compressively maintains securement of the underlying charge controller brace member 44.

The battery brace 46 is disposed underlying the charge controller brace member 44 and is configured to securably house detached around an extant battery 100. The battery brace 46 includes a U-shaped planar top piece 46A, disposed to overlie an extant battery 100, and a shunt member 46B disposed to abut adjacent the battery 100 disposed transversely underlying a pair of forks 46C disposed upon the planar top piece 46A.

The shunt member 46B is attachable to the top piece 46A by at least one L-shaped bracket 48. The shunt member 46B includes a copper shunt 50, connectable to the negative terminal of the battery 100, having an ohmmeter 52 disposed thereupon sensitive to the resistivity of said copper shunt 50, whereby current is readable therethrough. Current is therefore sensible when conducted through the copper shunt 50, and a current level is readable by means of a battery monitor 70, disposed in the topmost face panel 40, and oriented to interconnect with a terminal 52A disposed upon the ohmmeter 52.

A plurality of shock absorbent members 54 is included to tractably engage between the layered arrangement of the plurality of slide boards 30, to secure each of said plurality of slide boards 30 in position, and to absorb abrupt forces applied to the housing 20. The plurality of shock absorbent members 54 includes a plurality of rubberlike protrusions 54A disposed upon an undersurface of the planar piece 42A of the plurality of lid braces 42, for engagement upon the topmost face panel 40; a plurality of rubberlike protrusions 54B disposed atop the battery brace 46 U-shaped planar top piece 46A, for engagement against the overlying charge controller brace member 44; and a tractable pad 54C disposed underlying the battery 100 against an interior of the housing 20.

The topmost face panel 40 is accessible when the housing 20 lid 22 is moved to the open position. The topmost face panel 40 includes a control section 40A and a transparent window 40B through which window 40B the underlying layered arrangement of slide boards 30 is visible. At least one interior power outlet 60 is disposed in the topmost face panel 40. In the preferred embodiment herein disclosed, the at least one interior power outlet 60 includes a first interior power outlet 60A and a second interior power outlet 60B. Each of the at least one interior power outlets 60 is connectable to extant peripheral electronic devices.

A plurality of switches 62 is disposed in the control section 40A of the topmost face panel 40, each of said plurality of switches 62 disposed in circuit with each of the at least one power outlet 32, the pair of binding posts 36, and the at least one interior power outlet 60. Each of said plurality of switches 62 thereby controls connection of each of said outlets to the primary circuit 500 for delivery of power to extant electronic devices connected to said outlets.

The battery monitor 70 is disposed in the control section 40A of the topmost face panel 40. The battery monitor 70 is connectable to the ohmmeter 52, disposed atop the shunt member 46B disposed in the underlying battery brace 46, when the plurality of slide boards 30 is stacked within the housing 20. The battery monitor 70 enables reading of current conducted through the copper shunt 50 and provides an indication of the battery's 100 charge to a user.

Figure 5:
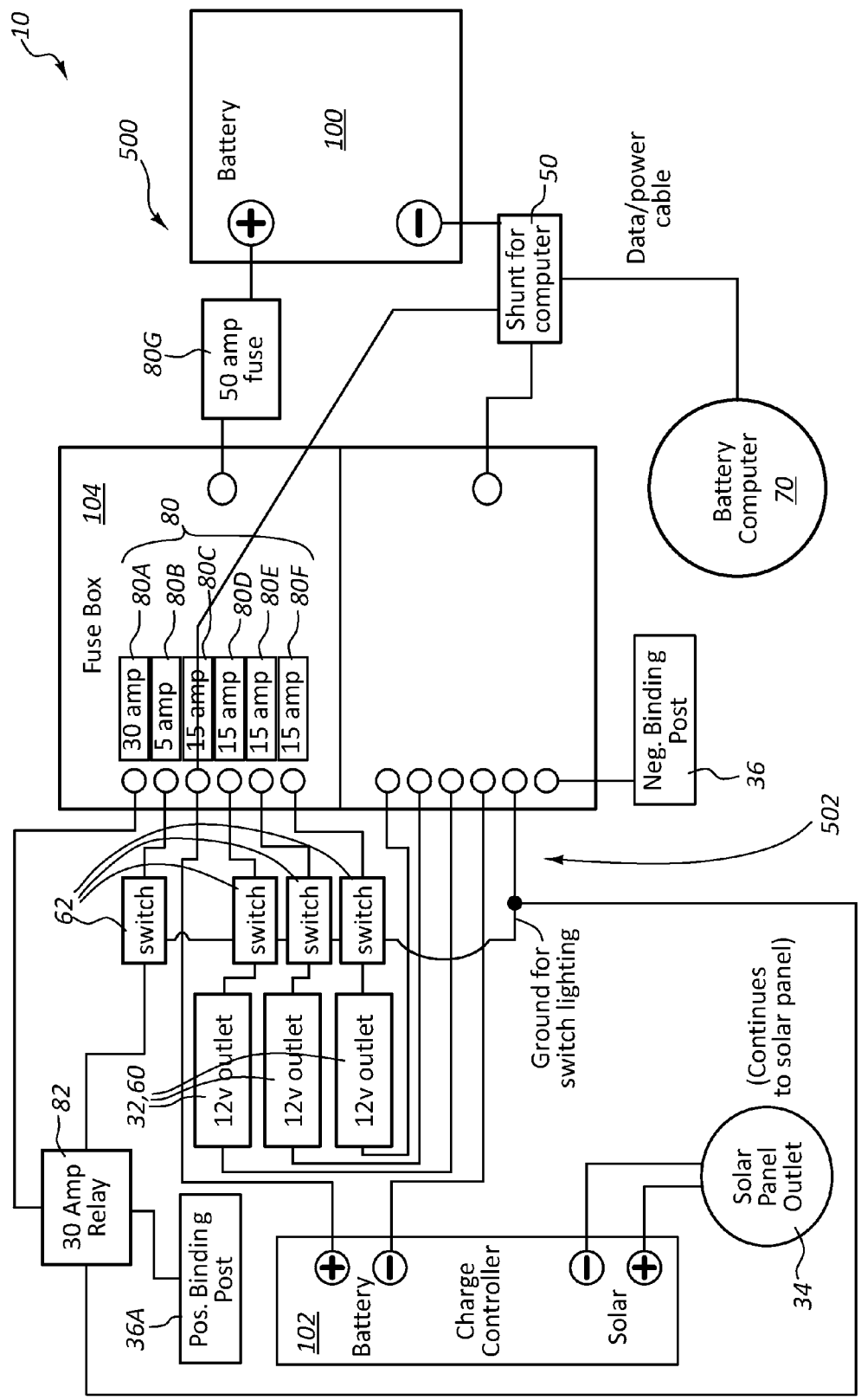
FIG. 5 is a circuit diagram.

With reference to FIG. 5, and discussing a preferred embodiment of the present invention 10, the fuse box 104 includes at least six fuses 80. The fuse box 104 is connected between the battery 100 and the charge controller 102 and each of the at least one power outlet 32, the pair of binding posts 36, and the at least one interior power outlet 60.

A first fuse 80A, operable up to 30 amps, is disposed connecting the primary circuit 500 to the pair of binding posts 36. A second fuse 80B, operable up to 5 amps, is disposed connecting the primary circuit 500 to a positive one of the pair of binding posts 36A. A 30 amp relay 82 is disposed between the first fuse 80A and said positive one of the pair of binding posts 36A, and one of the plurality of switches 62 is disposed between the fuse box 104 and the 30 amp relay 82.

A third fuse 80C, operable up to 15 amps, is disposed in circuit connecting the charge controller 102 and the battery 100 by way of the copper shunt 50. A fourth fuse 80D, operable up to 15 amps, is disposed in circuit connecting the at least one power outlet 32 disposed exteriorly upon the housing 20 to the primary circuit 500 and one of the plurality of switches 62, controlling connection of said power outlet 32 to the primary circuit 500, is disposed between said power outlet 32 and the fuse box 104.

A fifth fuse 80E, operable up to 15 amps, is disposed in circuit connecting the first interior power outlet 60A to the primary circuit 500 and one of the plurality of switches 62 is disposed in circuit between the first interior power outlet 60A and the fuse box 104.

A sixth fuse 80F, operable up to 15 amps, is disposed in circuit connecting the second interior power outlet 60B to the primary circuit 500 and one of the plurality of switches 62 is disposed in circuit between the second interior power outlet 60B and the fuse box 104.

A seventh fuse 80G, operable up to 50 amps, is disposed between the fuse box and the positive terminal of the battery 100.

The power port 34, connectable to an extant solar panel or other available external power source, is connected in circuit to the charge controller 102 whereby externally applied power is controlled to charge the battery 100. Each of the at least one power outlet 32, the pair of binding posts 36, and the at least one interior power outlet 60 is operable from power applied externally into the primary circuit 500 when the power port 34 is connected to an external power source.

Thus each of the plurality of slide boards 30 is removably securable within the housing 20, there compressively positional to secure said battery 100, charge controller 102, fuse box 104, and a plurality of wiring 502 internal to the housing 20 within a primary circuit 500 connecting the at least one power outlet 32, the pair of binding posts 36, the at least one interior power outlet 60, and the power port 34, whereby said battery 100 is chargeable by interconnection of the housing 20 with a solar panel, or other power source, and each of the plurality of slide boards 30 is separably detached and removable, as desired, for access to said battery 100, charge controller 102, fuse box 104, and wiring 502, and each of said plurality of slide boards 30 is securable in a stacked arrangement, thereby immobilized, shock resistant, and protected from the elements when the housing 20 is moved to the closed position, whereby electrical power is conveniently portable and storable for use when removed from an otherwise available power source.

What is claimed is:

1. A solar powered storage and distribution apparatus comprising having a water resistant housing securable between an open position and a closed position, said solar powered storage and distribution apparatus comprising a plurality of detached slide boards disposed in a layered arrangement compressively securable within said water resistant housing, said plurality of slide boards including a lid brace disposed to compressively engage against a topmost face panel, a pair of compression struts disposed underlying the face panel in compressible engagement with a charge controller brace member, said charge controller brace member configured to secure detached around a charge controller and a fuse box and thereat compressively engage against an underlying battery brace, said battery brace disposed to securably house detached around an extant battery, wherein each of the plurality of slide boards is removably securable within the housing and compressively positional therein to secure said battery, said charge controller, said fuse box, and a plurality of wiring internal to the housing maintained within a primary circuit connectable with at least one power outlet disposed upon the housing, whereby said battery is chargeable by interconnection of the housing with an extant solar panel, or other power source, and each of the plurality of slide boards is detached and removable, as desired, for access to said battery, said charge controller, said fuse box, and said wiring, and each of said plurality of slide boards is securable in a stacked arrangement, thereby shock resistant and protected from external elements when the housing is moved to the closed position.

2. The solar powered storage and distribution apparatus of claim 1 wherein the plurality of slide boards includes a plurality of shock absorbent members disposed therebetween whereby each of said plurality of slide boards, the battery, the charge controller, the fuse box, and the wiring, is compressively secured resistant to shocks when the housing is moved to the closed position.

3. The solar powered storage and distribution apparatus of claim 2 wherein the housing is connectable in circuit with the extant solar panel or the other external power source by a power port disposed exteriorly upon the housing whereby the battery is chargeable.

4. The solar powered storage and distribution apparatus of claim 3 wherein the at least one power outlet comprises a first power outlet disposed on one side of the housing, said first power outlet disposed in circuit with the primary circuit whereby the first power outlet is connectable to an extant electronic device and power is directable thereto.

5. The solar powered storage and distribution apparatus of claim 4 wherein the at least one power outlet further comprises a pair of binding posts disposed upon the housing for exterior interconnection with a peripheral electronic device, each of said pair of binding posts disposed in circuit with the primary circuit.

6. The solar powered storage and distribution apparatus of claim 5 further comprising a plurality of switches disposed upon the topmost face panel interiorly securable within the housing, one of said plurality of switches disposed in circuit with the first power outlet and another of said plurality of switches disposed in circuit with the pair of binding posts, wherein power is directable to each of said first power outlet and pair of binding posts, as desired, for powering externally connected peripheral electronic devices interconnected with the solar powered storage and distribution apparatus.

7. The solar powered storage and distribution apparatus of claim 6 wherein the at least one power outlet further comprises at least one interior power outlet disposed in the face panel, each of said at least one interior power outlet disposed in circuit with a respective one of at least one switch disposed in the face panel.

8. The solar powered storage and distribution apparatus of claim 7 further comprising a battery monitor disposed in the face panel.

9. The solar powered storage and distribution apparatus of claim 8 wherein the lid brace comprises:
a planar piece;
a first elongate obround piece; and
a second elongate obround piece;
wherein the first and second obround pieces are positional proximal parallel edges of the planar piece and thereat compressively engaged against the planar piece when the housing is moved to the closed position.

10. The solar powered storage and distribution apparatus of claim 9 wherein the first elongate obround piece and the second elongate obround piece are attached to an interior surface of a lid of the housing.

11. The solar powered storage and distribution apparatus of claim 10 wherein each of a pair of compression struts is disposed in a parallel and vertical orientation underlying the face panel proximal parallel edges of said face panel, each of said pair of compression struts compressively engaged between the face panel and the underlying charge controller brace member.

12. The solar powered storage and distribution apparatus of claim 11 wherein the charge controller brace member comprises a pair of connecting struts disposed endwise transversely underlying the charge controller and the fuse box at either end thereof, each of said pair of connecting struts protruding an extended portion beneath each of the charge controller and the fuse box, wherein the pair of compression struts compressively engage against the extended portion of each of the pair of connecting struts whereby the pair of compression struts compressively secure the charge controller brace member in position when the housing is moved to the closed position.

13. The solar powered storage and distribution apparatus of claim 12 wherein the battery brace comprises:
a U-shaped planar top piece disposed to overlie an extant battery, said top piece including a pair of forks; and
a shunt member disposed to abut adjacent the battery disposed transversely underlying the pair of forks, said shunt member attachable to the top piece by at least one L-shaped bracket, said shunt member including a copper shunt, connectable to the negative terminal of the battery, having an ohmmeter disposed thereupon sensitive to the resistivity of said copper shunt whereby current is readable therethrough;
wherein the battery is connectable to the fuse box disposed in the overlying charge controller brace member and current is readable through the copper shunt at the battery monitor disposed in the topmost face panel when each of the plurality of slide boards is positioned within the housing and the battery monitor interconnects with a terminal disposed atop the ohmmeter upon the shunt member.

14. The solar powered storage and distribution apparatus of claim 13 wherein the plurality of shock absorbent members includes a plurality of rubberlike protrusions disposed on an undersurface of the planar piece of the lid brace, a plurality of rubberlike protrusions disposed atop the U-shaped planar top piece of the battery brace, and a tractable pad disposed underlying the battery against an interior of the housing whereby each of said shock absorbent members tractably engages between the plurality of slide boards and closure of the housing tightly maintains position of each of the plurality of slide boards immovably secured under compression.

15. The solar powered storage and distribution apparatus of claim 14 wherein the plurality of slide boards are rendered from a lightweight, durable, polymeric material.

16. The solar powered storage and distribution apparatus of claim 15 wherein the at least one interior power outlet comprises a 12 volt first interior outlet and a 12 volt second interior outlet.

17. The solar powered storage and distribution apparatus of claim 16 wherein each said power outlet is connected in parallel and branched within the primary circuit.

18. The solar powered storage and distribution apparatus of claim 17 wherein the fuse box includes a plurality of fuses disposed in circuit between the battery and the pair of binding posts, the charge controller, and each of the at least one power outlets.

19. A solar powered storage and distribution apparatus comprising:
a water resistant, durable housing comprising:
a lid securable between an open position and a closed position;
at least one power outlet disposed exteriorly upon the housing for interconnection with extant electronic devices;
a power port disposed exteriorly upon the housing for interconnection with an extant solar panel or other extant external power source;
a pair of binding posts disposed exteriorly upon the housing, said pair of binding posts connectable to an extant peripheral device;
a plurality of detached slide boards disposed in a layered arrangement compressively securable within the water resistant housing when the lid is moved to the closed position, said plurality of slide boards including:

a topmost face panel having a seal member disposed perimetrically edgewise thereabouts;

a lid brace disposed to compressively engage against the topmost face panel, said lid brace including:
- a planar piece disposed to overlie and compressively engage against the topmost face panel;
- a first elongate obround piece disposed perpendicularly between the housing lid and the planar piece;
- a second elongate obround piece disposed perpendicularly between the housing lid and the planar piece in parallel with the first elongate obround piece, each of said first and second elongate obround pieces disposed to compressively engage the planar piece against the topmost face panel;

a charge controller brace member configured to secure detached around an extant charge controller and an extant fuse box, said charge controller brace member comprising:
- a pair of connecting struts disposed endwise underlying the extant charge controller and the extant fuse box at either end thereof, each of said pair of connecting struts protruding an extended portion out from beneath each of the charge controller and the fuse box;

a pair of compression struts disposed underlying the face panel in compressible engagement with the charge controller brace member, each of said pair of compression struts disposed to perpendicularly engage against the extended portion of each of the pair of connecting struts;

a battery brace disposed to securably house detached around an extant battery, said battery brace compressively engaged underlying the charge controller brace member, said battery brace comprising:
- a U-shaped planar top piece disposed to overlie the extant battery, said top piece including a pair of forks;
- a shunt member disposed to abut adjacent the battery disposed transversely underlying the pair of forks, said shunt member attachable to the top piece by at least one L-shaped bracet, said shunt member including a copper shunt, connectable to the negative terminal of the battery, having an ohmmeter disposed sensitive to the resistivity of said copper shunt, whereby current is readable therethrough;

a plurality of shock absorbent members including a plurality of rubberlike protrusions disposed upon an undersurface of the planar piece of the lid brace for engagement upon the topmost face panel, a plurality of rubberlike protrusions disposed atop the U-shaped planar top piece of the battery brace, and a tractable pad disposed underlying the battery against an interior of the housing;

at least one interior power outlet disposed in the topmost face panel;

a plurality of switches disposed in the topmost face panel, each of said plurality of switches disposed in circuit with a respective one of the at least one power outlet, the pair of binding posts, and the at least one interior power outlet; and a battery monitor disposed in the topmost face panel, said battery monitor connectable to the ohmmeter disposed atop the shunt member for reading of current conducted through the copper shunt;

wherein each of the plurality of slide boards is removably securable within the housing, said of the plurality of slide boards thereat compressively positional to secure said battery, said charge controller, said fuse box, and a plurality of wiring internal to the housing within a primary circuit connecting the at least one power outlet, the pair of binding posts, the at least one interior power outlet, and the power port, whereby said battery is chargeable by interconnection of the housing with a solar panel, or the other power source, and each of the plurality of slide boards is separably detached and removable, as desired, for access to said battery, said charge controller, said fuse box, and said wiring, and each of said plurality of slide boards is securable in a stacked arrangement, thereby shock resistant and protected from external elements when the housing is moved from the open position to the closed position.

\* \* \* \* \*